United States Patent

[11] 3,614,037

| [72] | Inventor | Alexander V. Vdolek<br>Bellevue, Wash. |
| [21] | Appl. No. | 859,937 |
| [22] | Filed | Sept. 22, 1969 |
| [45] | Patented | Oct. 19, 1971 |
| [73] | Assignee | The Boeing Company<br>Seattle, Wash. |

[54] AIRCRAFT COMBINATION THRUST REVERSER AND SOUND SUPPRESSOR AND A PARTICULAR FULL RANGE BALANCED THRUST REVERSER
4 Claims, 17 Drawing Figs.

[52] U.S. Cl. .................................................. 244/110 B,
239/265.13, 239/265.19
[51] Int. Cl. ..................................................... B64d 33/04
[50] Field of Search .......................................... 244/53–56,
110 B; 239/265.13, 265.19, 265.31, 256.39;
60/229

[56] References Cited
UNITED STATES PATENTS

| 3,055,174 | 9/1962 | Grotz et al. | 239/265.13 |
| 3,059,426 | 10/1962 | Laucher et al. | 239/265.31 |
| 3,095,697 | 7/1963 | Reinhart | 239/265.13 |
| 3,096,617 | 7/1963 | Bryant | 239/265.13 |
| 3,302,889 | 2/1967 | Di Sabato | 239/265.39 |
| 3,391,898 | 7/1968 | Miller | 239/265.19 |
| 3,524,588 | 8/1970 | Duval | 239/265.13 |

Primary Examiner—Milton Buchler
Assistant Examiner—Steven W. Weinreib
Attorneys—Glenn Orlob, Kenneth W. Thomas and Theron H. Nichols ABSTRACT: A new thrust reverser is so shaped that sound suppressor chutes may be positioned between the thrust reverser doors and within the fore and aft limits of the thrust reverser doors to form a compact, efficient combination thrust reverser and sound suppressor. A modulating thrust reverser, the elements of which being supported at their centroids for effortless movement to all positions between retracted position for providing zero reverse thrust from a reaction engine exhaust to fully extended position for generating maximum reverse thrust for use as (1) a modulating thrust reverser as a braking device on the ground subsequent to landing or prior to an aborted takeoff, (2) a modulating thrust reverser for in-flight reversing for rapid descent, and (3) a thrust-modulating device for rapid thrust adjustments as may be required during a landing approach. The balanced doors require only a small actuating force for movement thereof, and for holding thereof in the end positions or any position intermediate thereof, independent of the thrust setting of the engine. Likewise, noise attenuation of the jet exhaust results from the intermediately positioned thrust reverser doors, during thrust modulation during landing approach.

Tertiary doors which are located on the outer surface of a secondary nozzle provide aerodynamically smooth air ducts for supplying ambient cooling air and for improving the efficiency of the secondary nozzle during takeoff and through subsonic flight. Further, tertiary doors comprising fore and aft portions covering the air ducts adjacent the engine air intake, are connected to the thrust reverser doors for opening only the aft portion of the tertiary door to accordingly eject away from the aircraft to prevent attachment of the hot exhaust gases to the nacelle skin and the accompanying scorching and sooting thereof and to prevent reingestion of the exhaust gases into the engine air intake. Some of the tertiary doors are further responsive to the thrust reverser doors for being held closed during reverse thrust to adjust the exit area for proper engine area matching. Some doors are closed to prevent impingement of the exhaust gases against adjacent aircraft surfaces. The shape of the new thrust reverser doors provides adequate room for the positioning of sound suppressor chutes between the thrust reverser doors to accordingly form a compact and efficient combination thrust reverser and sound suppressor unit.

INVENTOR:
ALEXANDER V. VDOLEK
BY

Theron H. Nichols
AGENT

INVENTOR:
ALEXANDER V. VDOLEK
BY

Theron H. Nichols
AGENT

INVENTOR:
ALEXANDER V. VDOLEK
BY
Theron H. Nichols
AGENT

Fig.13.

INVENTOR:
ALEXANDER V. VDOLEK

3,614,037

AIRCRAFT COMBINATION THRUST REVERSER AND SOUND SUPPRESSOR AND A PARTICULAR FULL RANGE BALANCED THRUST REVERSER

SUMMARY OF THE INVENTION

A combination aircraft thrust reverser and sound suppressor is disclosed in which both fit or nest together in a housing attached to the rear of an aircraft or to the jet engine, both not taking up any more space than either a thrust reverser of a sound suppressor alone. This feature is accomplished by shaping the thrust reverser doors and the sound suppressor chutes to fit between each other. While a maximum or a certain optional number of thrust reverser doors are positioned around the internal periphery of the housing, an equal number of sound suppressor chutes are fitted between the retracted doors in providing a greatly improved and more efficient jet aircraft.

In addition, a new thrust reverser is disclosed comprising a plurality of doors, each door being supported at its centroid or center of pressure, whereby an actuator connected to the outer end of the door requires very little force to position the thrust reverser door at any position between the fully extended reverse thrust position and retracted position of zero reverse thrust. The little effort required to move each thrust reverser door is little affected by any variation in thrust of the aircraft jet engine. The balanced thrust reverser may be used as: (1) a modulating thrust reverser as a brake on the ground subsequent to landing or prior to an aborted takeoff, (2) a modulating thrust reverser for inflight reversing for rapid descent and (3) a thrust modulating device for rapid thrust adjustments as may be required during a landing approach.

Further, tertiary doors are connected to the thrust reversers comprising two interconnected portions wherein the aft portion of the tertiary door opens during reverse thrust for preventing reingestion of the exhaust gases and scorching and sooting of the aircraft skin, and both fore and aft portions of the tertiary door open during takeoff and subsonic flight to provide an aerodynamically smooth inlet duct for supplying air to a secondary nozzle.

In addition, a few of the tertiary doors are also responsive to the thrust reverser doors for remaining closed during reverse thrust for preventing hot exhaust gases from attaching to adjacent nacelle or wing surface.

Accordingly, a primary object of this invention is to provide a new thrust reverser which requires practically no force to move it to any position between the fully extended position for generating maximum reverse thrust to retracted position for generating zero thrust, and holding any thrust setting regardless of the engine power setting.

A further object of this invention is to provide a new effortless, modulating thrust reverser as a braking device on the ground subsequent to landing or prior to an aborted takeoff, as a modulating thrust reverser for inflight reversing for rapid descent, and as a thrust-modulating device for rapid thrust adjustments as may be required during a landing approach.

Another object of this invention is to provide tertiary doors responsive to the thrust reverser for preventing reingestion of the reverse thrust exhaust gases and scorching and sooting of the airplane skin, and which tertiary doors form an aerodynamically smooth inlet duct for supplying air to a secondary nozzle.

A still further object is to provide a few tertiary doors responsive to the thrust reverser for being held close during reverse thrust for preventing exhaust of the hot gases against the adjacent wing surface.

Still another object is to provide an integrated thrust reverser and noise suppressor which provides space for noise suppressor chutes integrated within the space available between the thrust reverser doors.

Yet another object of this invention is to provide a thrust reverser that has a very slight leakage with a resultant small loss in reverse thrust and which retracts into a nozzle housing for the elimination of practically all resistance to forward thrust. Other objects and various advantages of the disclosed combination aircraft thrust reverser and sound suppressor and a particular full range balanced thrust reverser will be apparent from the following detailed description, together with the accompanying drawings, submitted for purposes of illustration only.

BRIEF DESCRIPTION OF THE DRAWINGS

The drawings diagrammatically illustrate by way of example, not by way of limitation, two forms of the invention wherein like reference numerals designate corresponding parts in the several views in which.

DESCRIPTION OF THE PREFERRED EMBODIMENTS

The invention is not limited in its application to the details of construction and arrangement of parts shown and described, since the invention is capable of other embodiments and of being practiced or carried out in various other ways. Also, it is to be understood that the phraseology or terminology employed herein is for the purpose of description and not of limitation.

Figure 1:
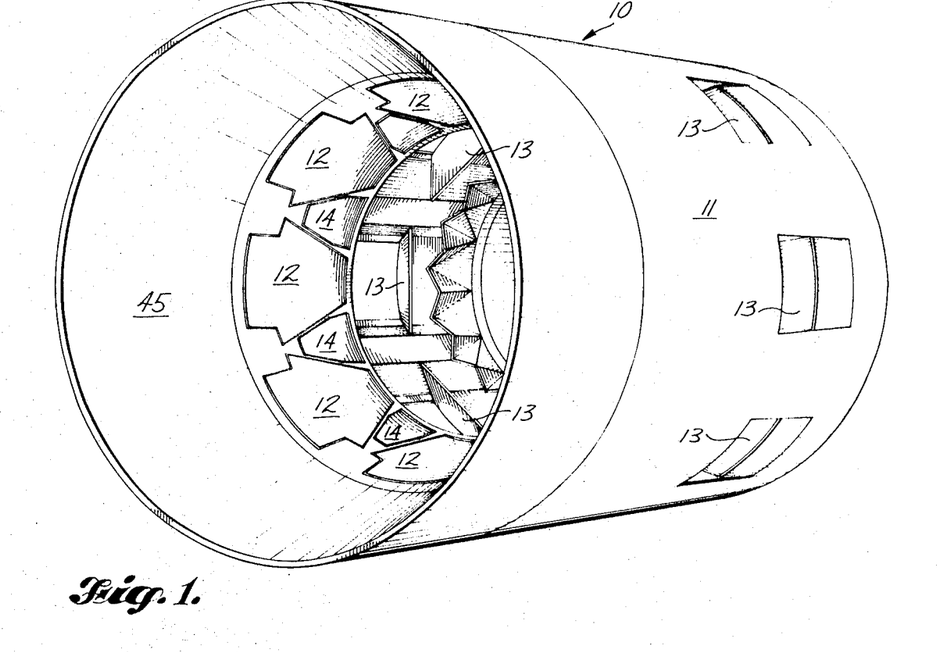
FIG. 1 is a perspective view from the right rear of the new combination thrust reverser and sound suppressor for attachment to a jet engine, wherein the thrust reverser doors are illustrated retracted, all tertiary doors are open, and the sound suppressor chutes are stowed.

FIG. 1, a rear perspective view of the combination thrust reverser and sound suppressor 10 for attachment to a conventional jet engine, comprises a housing 11 for supporting the thrust reverser doors 12, tertiary blow-in doors 13, sound suppressor chutes 14, and secondary nozzle 45. Housing 11 may be attached directly to the aircraft or to various jet engines on the aircraft having a primary exhaust nozzle.

Figure 2A:
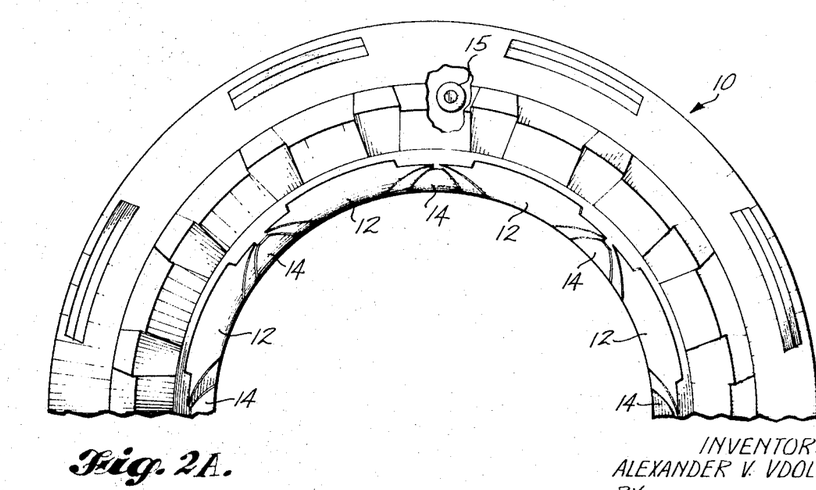
FIG. 2A is a rear view of the upper half portion of the thrust reverser and sound suppressor of FIG. 1 with parts broken away showing one of four thrust reverser door actuators.

FIG. 2A, a rear view in elevation of the top half of the combination thrust reverser and sound suppressor 10 with parts broken away illustrates the thrust reverser in cruise position and one of the four thrust reverser door actuators 15.

FIG. 2A, as well as FIG. 1 further illustrates how the thrust reverser doors 12 and the sound suppressor chutes 14 all freely retract into the housing 11 with no interference with each other and with very economical use of space in the housing.

Figure 2B:
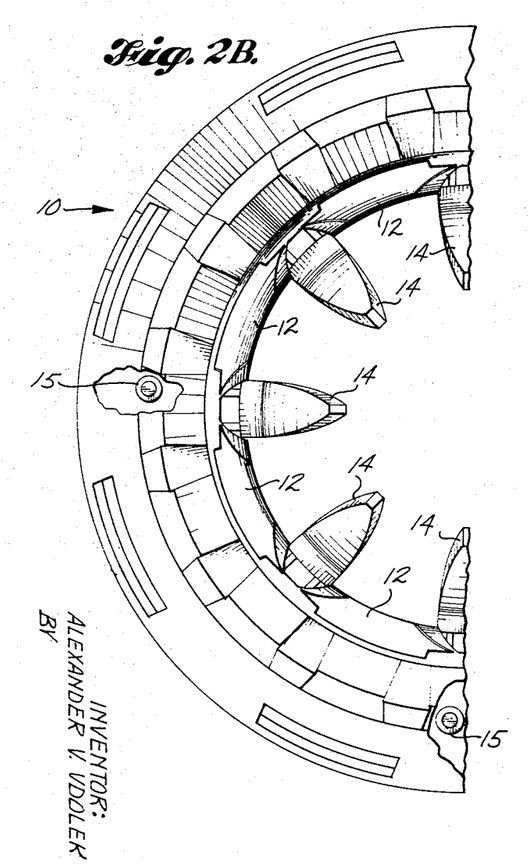
FIG. 2B is a rear view of the left half of the thrust reverser and sound suppressor similar to FIG. 2A, except the sound suppressor chutes are extended independently of the thrust reverser for operation during takeoff.

Likewise, FIG. 2B, a rear elevation of the left half of the combination thrust reverser and sound suppressor illustrates how the sound suppressor chutes 14 may be extended to fully opened position independently of the retracted thrust reverser doors 12. This condition prevails during takeoff and landing approach.

Figure 2C:
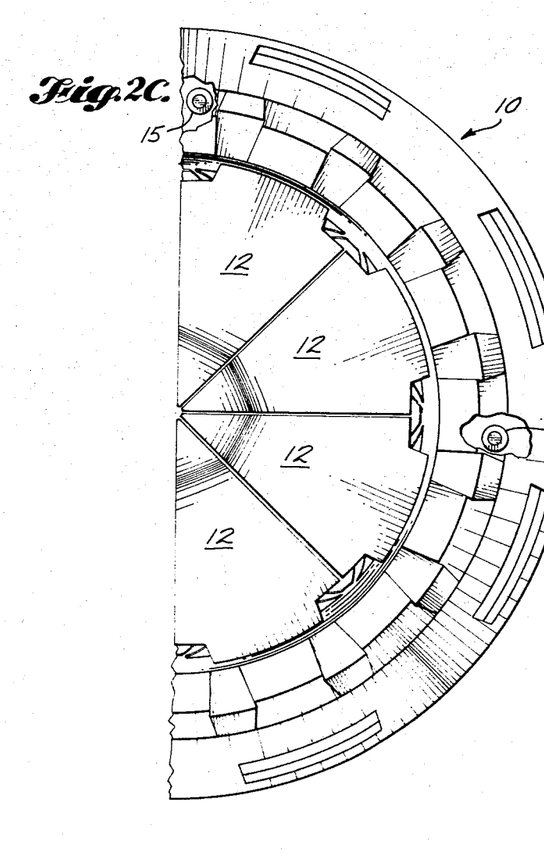
FIG. 2C is a rear view of the right half of the thrust reverser and sound suppressor similar to FIG. 2A, except the thrust reverser doors are fully extended.

FIG. 2C, a rear elevation of the right half of the combination thrust reverser and sound suppressor 10, illustrates the thrust reverser doors 12 being fully extended to maximum reverse thrust position.

Figure 3:
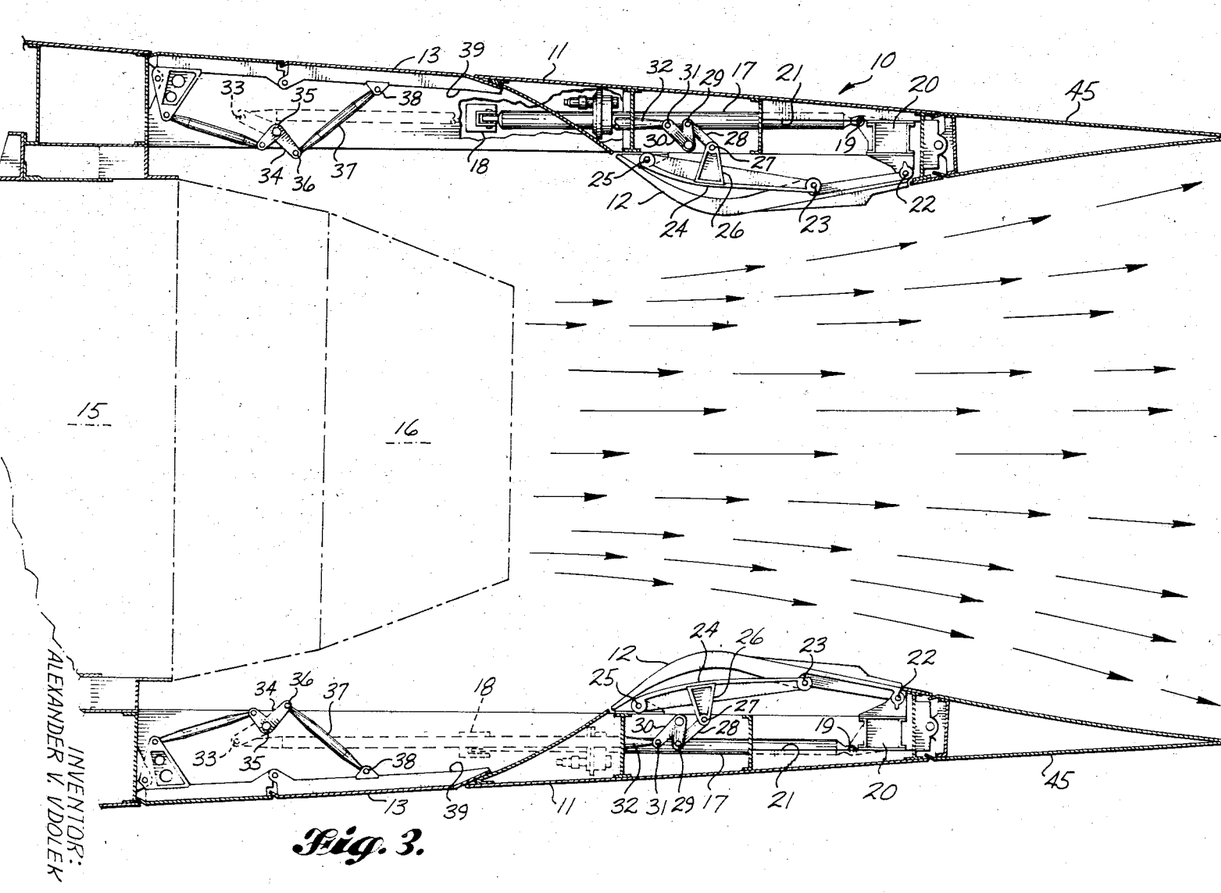
FIG. 3 is a longitudinal section of the combination thrust reverser and sound suppressor shown mounted on a conventional turbojet engine with the thrust reverser doors and the tertiary doors being retracted in the housing, as for supersonic flight.

FIG. 3, a longitudinal section of the combination thrust reverser and sound suppressor 10 is shown mounted on a conventional turbojet engine 15 which has exhaust primary exhaust nozzle 16, the housing 11 of the secondary nozzle accommodating the thrust reverser doors 12. In supersonic cruise position, the thrust reverser doors 12 are retracted into the internal wall area of the secondary nozzle housing 11, the sound suppressor 14 (not shown in FIG. 3) are retracted, the tertiary doors 13 are closed, and the free floating secondary nozzle flaps 45 are wide open due to the pressure differential between the nozzle internal pressure and the ambient pressure for providing more aerodynamically efficient jet aircraft.

Figure 4:
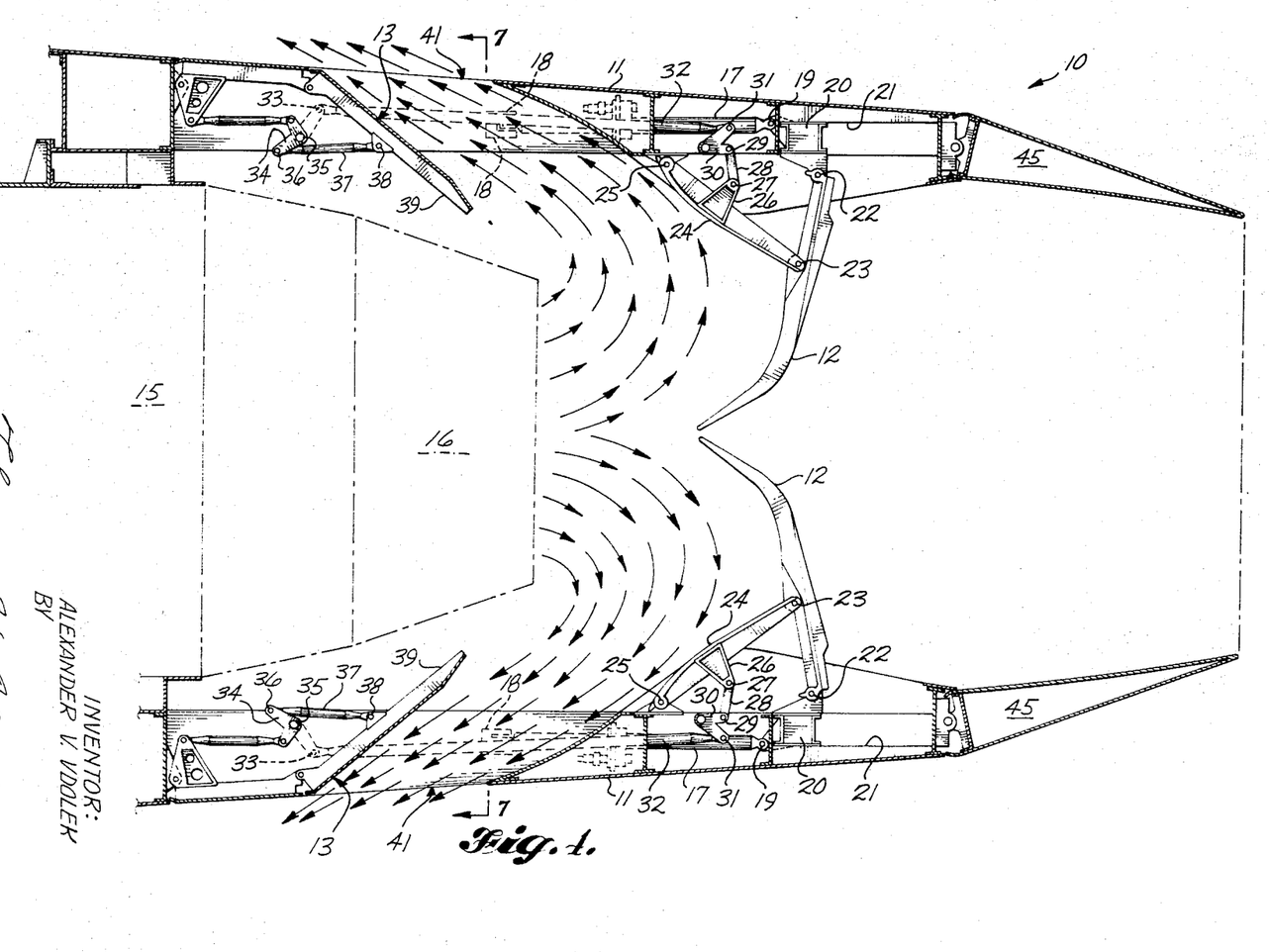
FIG. 4 is a sectional view similar to FIG. 3, except the thrust reverser doors are fully extended and the tertiary doors are fully opened for maximum reversing either inflight or on the ground.

FIG. 4, a longitudinal section of the combination thrust reverser and sound suppressor 10 mounted on a turbojet engine in subsonic speed condition, illustrates how thrust reverser doors 12 are extended from their retracted position of FIG. 3 to this fully extended position of FIG. 4. One of the thrust reverser actuators 17, one shown at each of the top and bottom portions of FIGS. 3 and 4 has its base pivotally connected to secondary nozzle housing 11, with pivot 18 and its actuable end connected with pivot 19 to carriage 20 slideable on track 21. With the inner end of thrust reverser door 12 extending to the center of the thrust reverser, the outer end of the thrust reverser door 12 pivotally connected with pivot 22 to actuable carriage 20.

At the center of pressure or centroid 23, thrust reverser door 12 is pivotally connected to one end of supporting lever 24, the other end of the lever being pivotally connected with pivot 25 to the secondary nozzle housing 11. Intermediate the end of lever 24 is integral arm 26 pivotally connected with pivot 27 to link 28, which in turn is pivotally connected with pivot 29 to one end of bellcrank 30. Pivot 31, FIG. 4, pivotally connects the other end of the bellcrank 30 to elongated rigid link 32. Link 32 is connected with pivot 33 to a lost motion bellcrank 34 pivotally mounted on housing 11 with pivot shaft 35. Pivot 36 connects to bellcrank 34 one end of link 37 and pivot 38 connects the other end of link 37 to aft position 39 of the tertiary blow-in door 13. Operation of fore portion 40 of the tertiary blow-in door 13 is described hereinafter in conjunction with FIG. 12.

Accordingly, FIG. 4 illustrates the operation of the combination thrust reverser and sound suppressor 10 wherein thrust reverser doors 12 may be actuated to any position between the retracted position of FIG. 3 and the fully extended, maximum reverse thrust of this FIG. 4. Here, in FIG. 4 actuator 17 has pulled the carriage 20 and the outer end of door 12 from a retracted position on the right end of track 21, FIG. 3 to the fully extended position on the left end of track 21, FIG. 4. As the outer end and its pivot 22 of thrust reverser door 12 is actuated to the left, as viewed in FIG. 4, link 24 forces the door 12 up or inward into the exhaust stream, supporting the door at its centroid and pivotal connection 23. Simultaneously with inward movement of the thrust reverser door 12, upward or inward movement of link 24 connected thereto pulls long link 32 aft by linkage 26, 28, and 30 to thus open aft portion 39 of the tertiary door through linkage 34 and 37.

All of the jet engine exhaust is thus reversed in direction and directed forwardly out the opening 41, FIG. 4, caused by the tertiary door portion 39. The opening of only door portion 39 insures that no attachment of flow of the exhaust gases to the surface of the forwardly positioned nacelle (not shown) occurs. Full or maximum reverse thrust thus results and may be required for braking on the ground just subsequent to landing, just following a decision to abort a takeoff, or for maximum in-flight reversing for rapid descent. Secondary, nozzle free floating flaps 45 are shown closed to the maximum distance due to the pressure differential between the nozzle inside pressure and the ambient pressure for providing an aerodynamically efficient aircraft.

Figure 5:
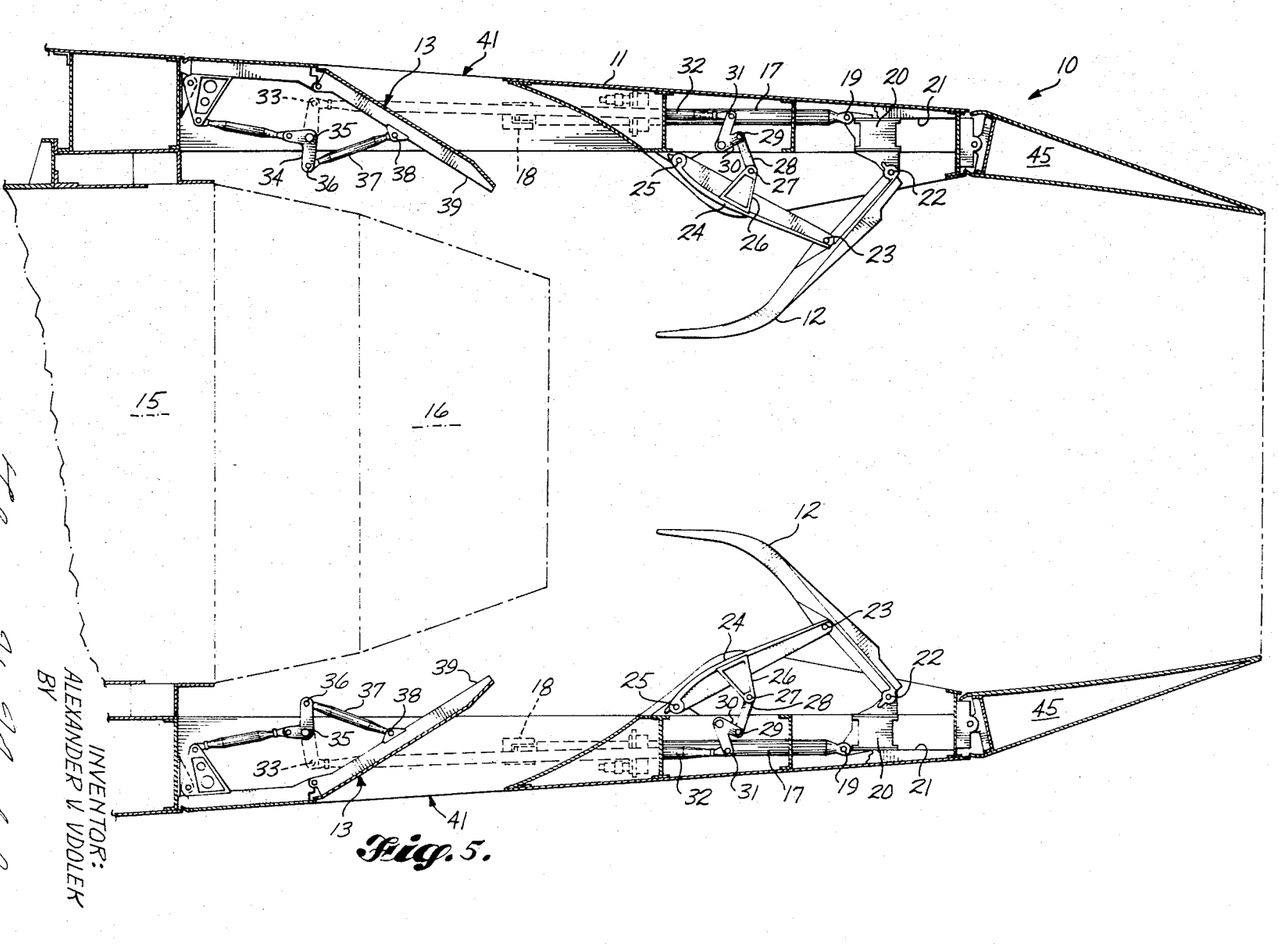
FIG. 5 is a longitudinal sectional view similar to FIG. 3, except the thrust reverser doors are only partially open, and the tertiary doors are opened for modulating the reverse thrust as for inflight reversing or for rapid thrust adjustments.

FIG. 5 illustrates a typical position of the thrust reverser doors 12 as being intermediate to the retracted position and the fully extended or maximum reverse thrust position. Because the thrust reverser doors 12 are pivotally connected at their centroids 23 and supported at one end, little force is required to pivot all doors about their centroids to any and all positions desirable and required for braking with modulated reverse thrust independent of the thrust setting of the engine for in-flight reversing, for rapid descent, or for rapid thrust adjustments as may be required for a fast correction during a landing approach or in conjunction with "direct lift" devices.

Figure 6:
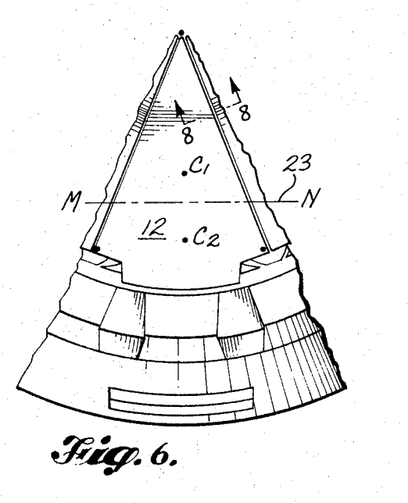
FIG. 6 is an enlarged view of a thrust reversing door of FIG. 2C.

FIG. 6 is a rear view disclosing details of a single thrust reverser door 12 having a center of pressure or centroid 23 on line M—N with points $C_1$ and $C_2$ identifying the centroids of the inner and outer portions of the door 12 on opposite sides of line M—N. On the front side of the door 12 (not shown in FIG. 6), with supporting lever 24 (not shown in FIG. 6) being pivotally connected to the front of the thrust reverser door 12 on the center-of-pressure line M—N, all forces on the door are carried by the supporting lever 24, so that little, if any, force is required to rotate the door 12 about center-of-pressure line M—N.

Figure 7:
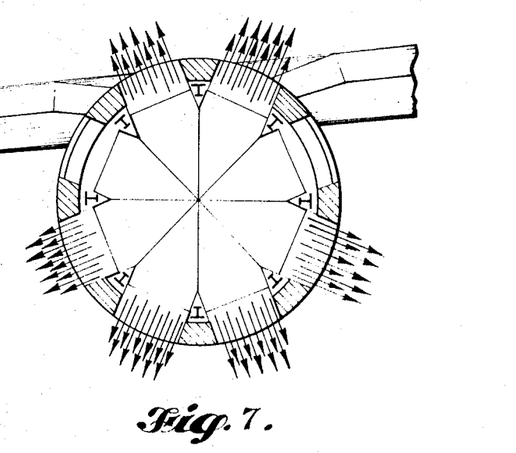
FIG. 7 is a vertical, transverse, sectional view of the thrust reverser through the tertiary doors illustrating a few of the doors being closed during reversing only.

Fig. 7, a vertical sectional view through the tertiary doors during reverse thrust wherein a particular number of tertiary doors is used to permit the discharge of the reverse thrust flow to change the direction of the momentum of the exhaust gas to obtain the required reverse thrust from the engine. FIG. 7 discloses how two tertiary doors which would exhaust hot gases onto the wing are closed only during reverse thrust. However, during all other flight operations, these doors may open as required for supply of cooling air to the secondary nozzle 45, FIG. 4.

Figure 8:
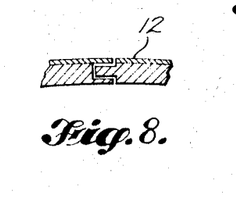
FIG. 8 is a sectional view taken at 8–8 on FIG. 6.

FIG. 8, a sectional view at 8—8 on FIG. 6, discloses the tongue-and-groove seal connection reducing the air leakage between adjacent thrust reverser doors, while various seals may be utilized, if desired.

TERTIARY DOORS

During normal forward thrust engine operation, the tertiary doors 13, FIG. 4 are free floating to assume the position dictated by the pressure differential.

The tertiary doors 13 are maintained open from takeoff to transonic speed. As supersonic speed is reached, the tertiary doors close because the internal pressure acting on the doors becomes higher than the ambient pressure.

For speeds up to and through transonic speed, the tertiary door airflow provides cooling air over the surfaces of the secondary nozzle. Then during supersonic flight when the tertiary doors 13 are closed, cooling air for the secondary nozzle is supplied from the primary air intake.

Figure 9:
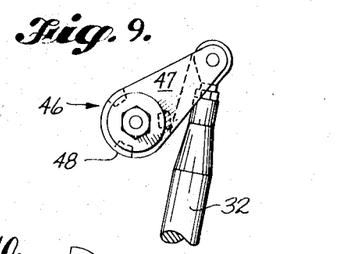
FIG. 9 is a view taken at 9–9 on FIG. 11.
Figures 10, 11:
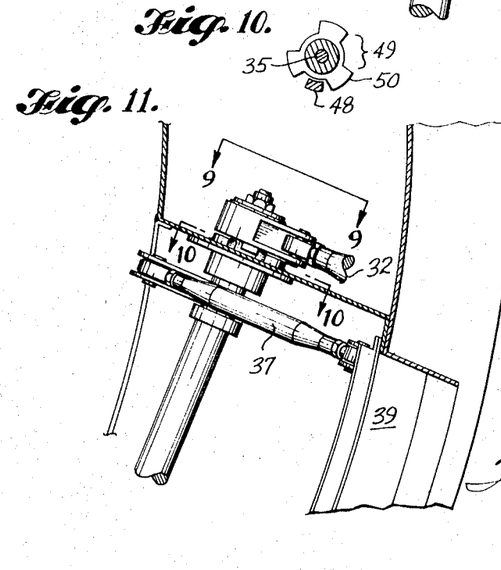
FIG. 10 is a sectional view taken at 10–10 on FIG. 11.
FIG. 11 is a detailed view, with parts cut away, of the tertiary door operating mechanism.
Figure 12:
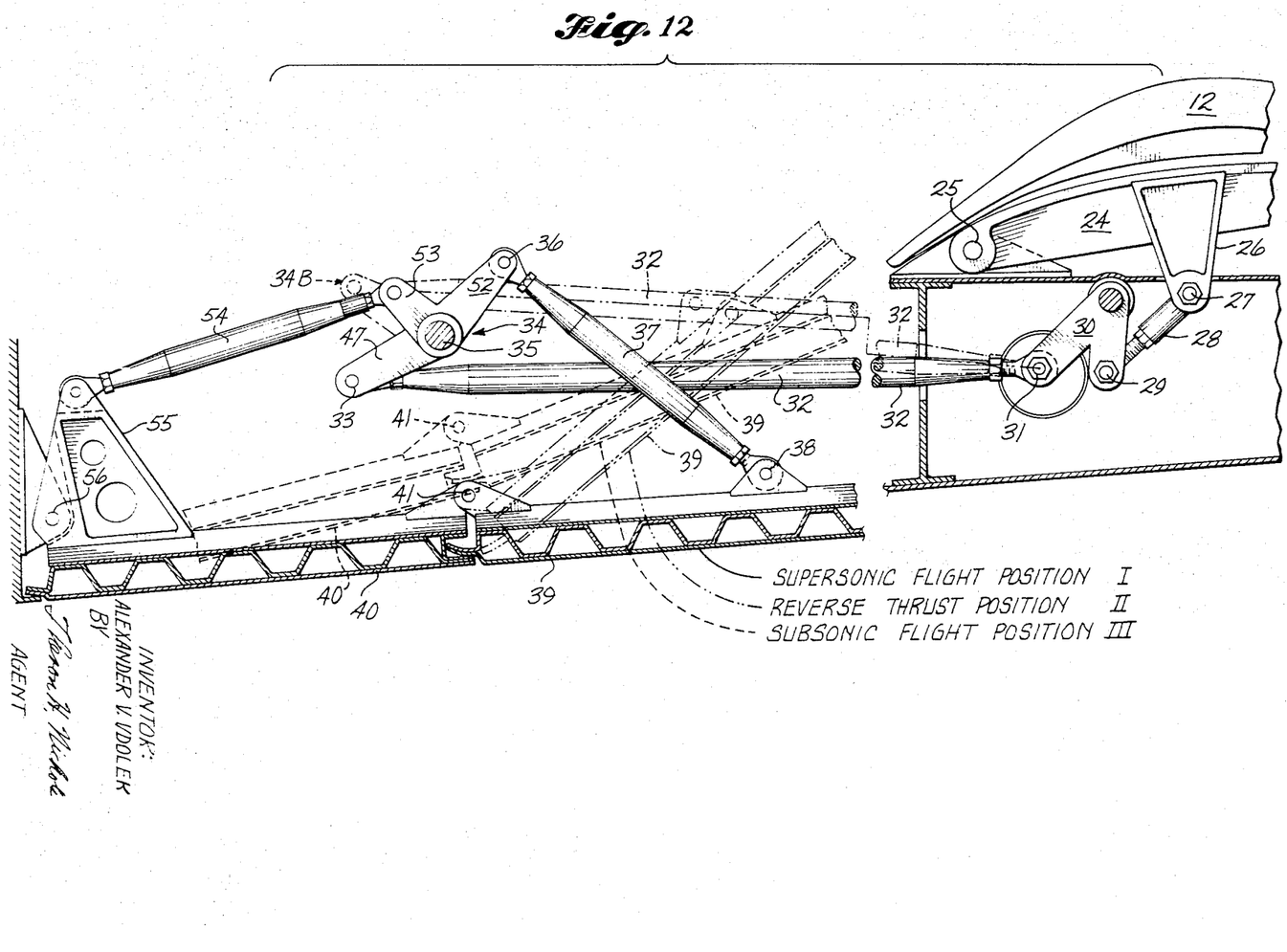
FIG. 12 is a longitudinal sectional view illustrating details of the tertiary door operating mechanism in free floating and forward thrust condition, and operated by the thrust reverser being in reverse thrust or thrust modulating condition.

FIGS. 9 and 10 are sectional views taken at 9—9 and 10—10, respectively, on FIG. 11. FIGS. 9, 10 and 11 are detailed views of the lost motion mechanism for a tertiary door 13, FIG. 3. The free floating operation of the tertiary doors is provided by the lost motion crank mechanism 46, FIG. 9 in arm 47 between actuating link 32 which is moved by thrust reverser door 12, FIG. 4, and link 37 for operating the tertiary door part 39. Arm 47, FIG. 9, has a number of dogs 48 on its hub face which fit in spaces 49, FIG. 10, on dog flange 50 on dog flange pivot shaft 35. Thus large openings or spaces 49 with small dog 48 therein provide the lost motion for free flowing tertiary door portion 39, FIG. 4 to move between the takeoff or subsonic position 0III, FIG. 12, shown in dash-dash lines to the fully closed supersonic flight position illustrated in solid lines, position 01, both positions being shown in FIG. 12. The aft tertiary door portion 39 is pivotally connected to fore tertiary door portion 40 by pivot 41. The initial movement of the thrust reverser door from cruise position to reverse thrust position, will absorb the lost motion space of the small dogs 48 in large spaces 49 as shown in FIG. 10, and cause the tertiary door to move into thrust modulating or reverse thrust position as described below.

FIG. 11 illustrates the tertiary door-actuating mechanism.

FIG. 12 shows how the raising of thrust reverser door 12 raises arm 26, pulling link 28 to rotate bellcrank 30 counterclockwise to pull elongated link 32 aft or to the right and rotate lost motion arm 47 counterclockwise about dog flange shaft 35.

This initial movement of the thrust reverser door moves arm 47 and its dogs 48, FIG. 10 through space 49 on the dog flange 50 until the free lost motion space is absorbed.

With further movement beyond the free floating or lost motion movement provided, the thrust reverser door causes dog 48, FIG. 10, to engage dog flange 50 on shaft 35 to rotate bellcrank arm 52, FIG. 12 of bellcrank 34 for actuating tertiary door portions 39 and 40, to reverse thrust position 011. This results when the other and shorter arm 53, FIG. 12 of bellcrank 34 actuates link 54 and arm 55 integral with fore tertiary door 40 and pivoted to the secondary nozzle housing 11 with pivot 56.

FIG. 12 further shows how the ratio of the lengths of the bellcrank arms 52 and 53 causes rotation of both fore and aft tertiary doors to provide a gradual slope of the two doors to form an aerodynamically smooth duct, position No. III for optimum influx of tertiary air to the secondary nozzle during takeoff and up to supersonic flight condition.

FIG. 12 likewise discloses the linkage for closing some tertiary doors during reverse thrust as the two doors 13 illustrated in FIG. 7 which would cause exhaust of hot gases impinging against the wing if open. These two doors are closed during reverse thrust by the linkage of FIG. 12 wherein lost motion bellcrank 34 is reset approximately 90° counterclockwise on shaft 35 of the dot-dash position 34B. The number of open tertiary doors is determined by the required exit area of the reverse thrust flow. The selection of the position of the open tertiary door parts permits directing the flow of the exhaust gases to prevent the reingestion into the engine air intake, and impingement of the hot exhaust gases on the airplane skin causing scorching and sooting thereof.

Figure 13:
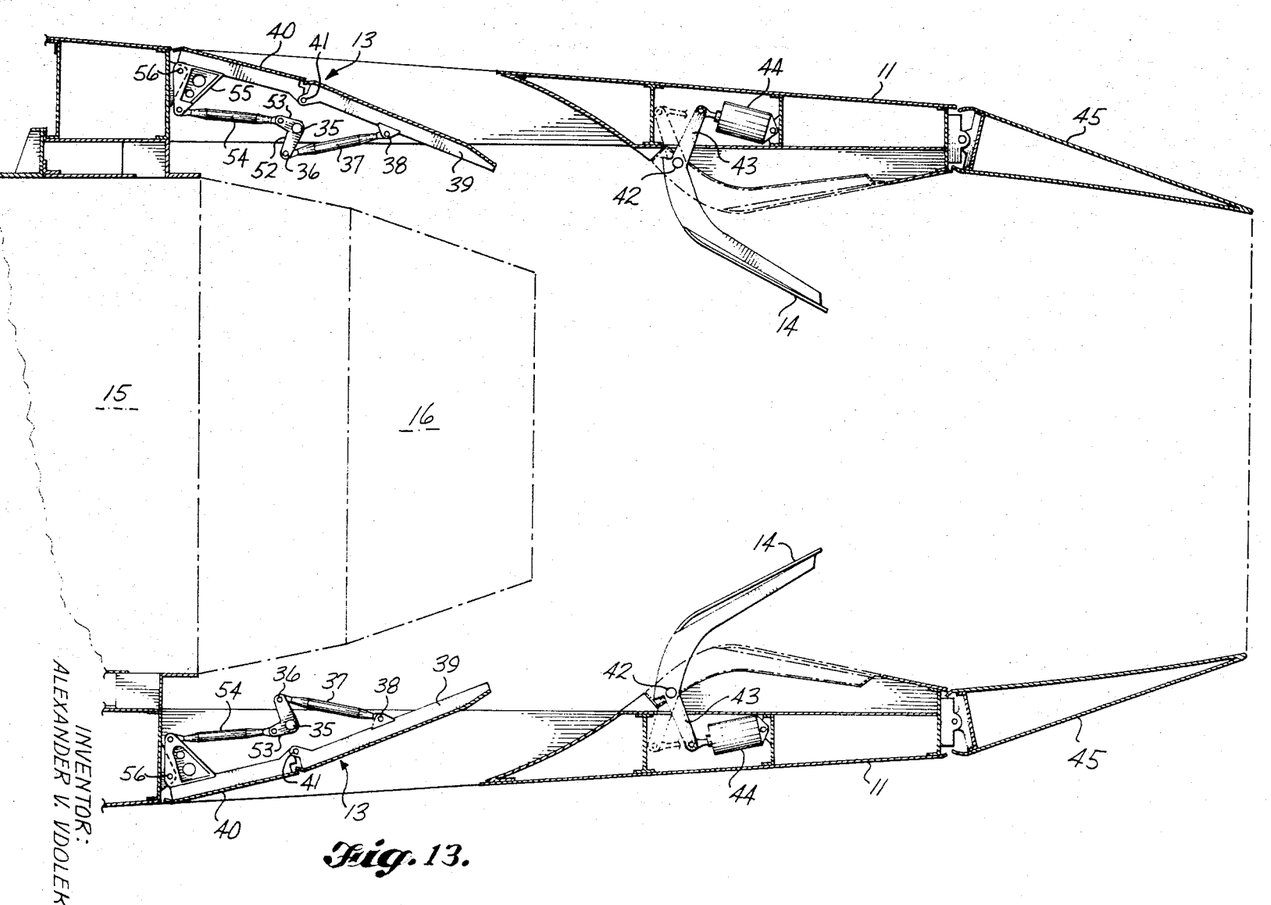
FIG. 13 is a longitudinal sectional view similar to FIG. 3, except the tertiary doors are free floating inwardly and the noise suppressor is fully extended in takeoff or landing approach condition.

FIG. 13, a longitudinal sectional view of the combined thrust reverser ans sound suppressor shows the sound suppressor extended and discloses the tertiary doors open as for takeoff of the aircraft. The sound suppressor chutes 14, FIG. 13, are each pivotally connected at their forward ends to internal wall structure of the housing 11 with pivot 42. Horn 43, fixedly connected to the chute 14, protrudes into the housing wall to pivotally connect with push-pull actuators 44 for extending and retracting the sound suppressor chute 14. A novel feature of the combination thrust reverser and sound suppressor is their efficient and economical integration with each other as illustrated in FIG. 1, either one being operable separately or both together, yet conservation of aircraft space is of prime concern.

Further in FIG. 13 both aft-and-fore parts 39 and 40 of the tertiary door 13 are actuated to open position. This increases flow of air and decreases drag by forming an aerodynamically smooth air duct and quite different from that shown in FIG. 4, in which the reverse thrust gas is exhausted clear of the aircraft.

Figure 14:
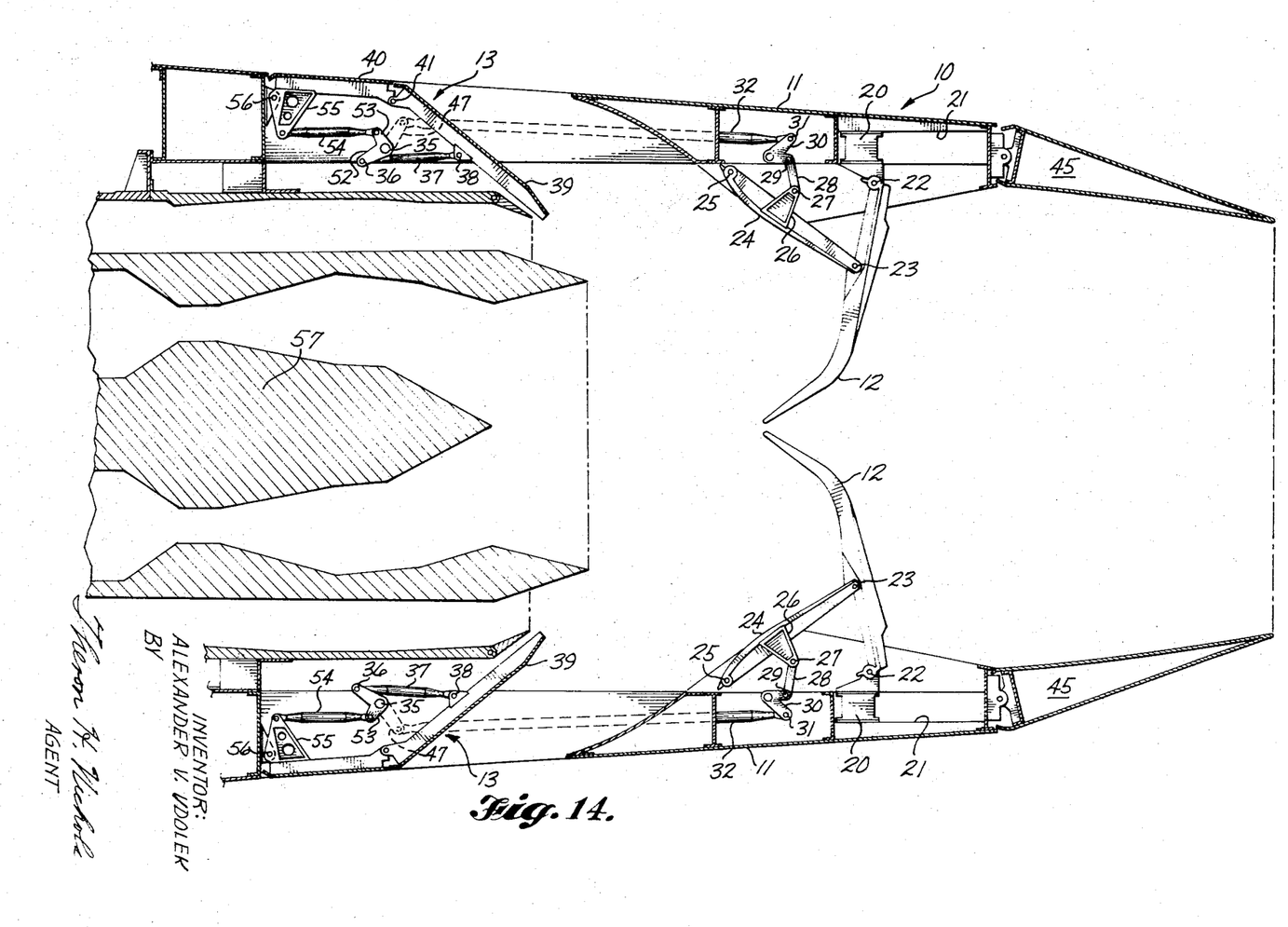
FIG. 14 is a modification of FIG. 4 wherein the thrust reverser is modified to operate on a ducted fan or bypass type of jet engine illustrated in full reverse thrust position.

FIG. 14 is a modification of FIG. 4 wherein the thrust reverser 12 which is illustrated in fully extended position is modified to mount on and reverse the thrust of a ducted fan or bypass type of jet engine 57, FIG. 14. Similarly, tertiary door part 39 is opened to direct the exhaust gases away from the aircraft to prevent reingestion. Secondary nozzle flaps 45 being free floating, are closed slightly due to the pressure differential between the nozzle inside pressure and the ambient pressure for providing an aerodynamically efficient jet aircraft.

Figure 15:
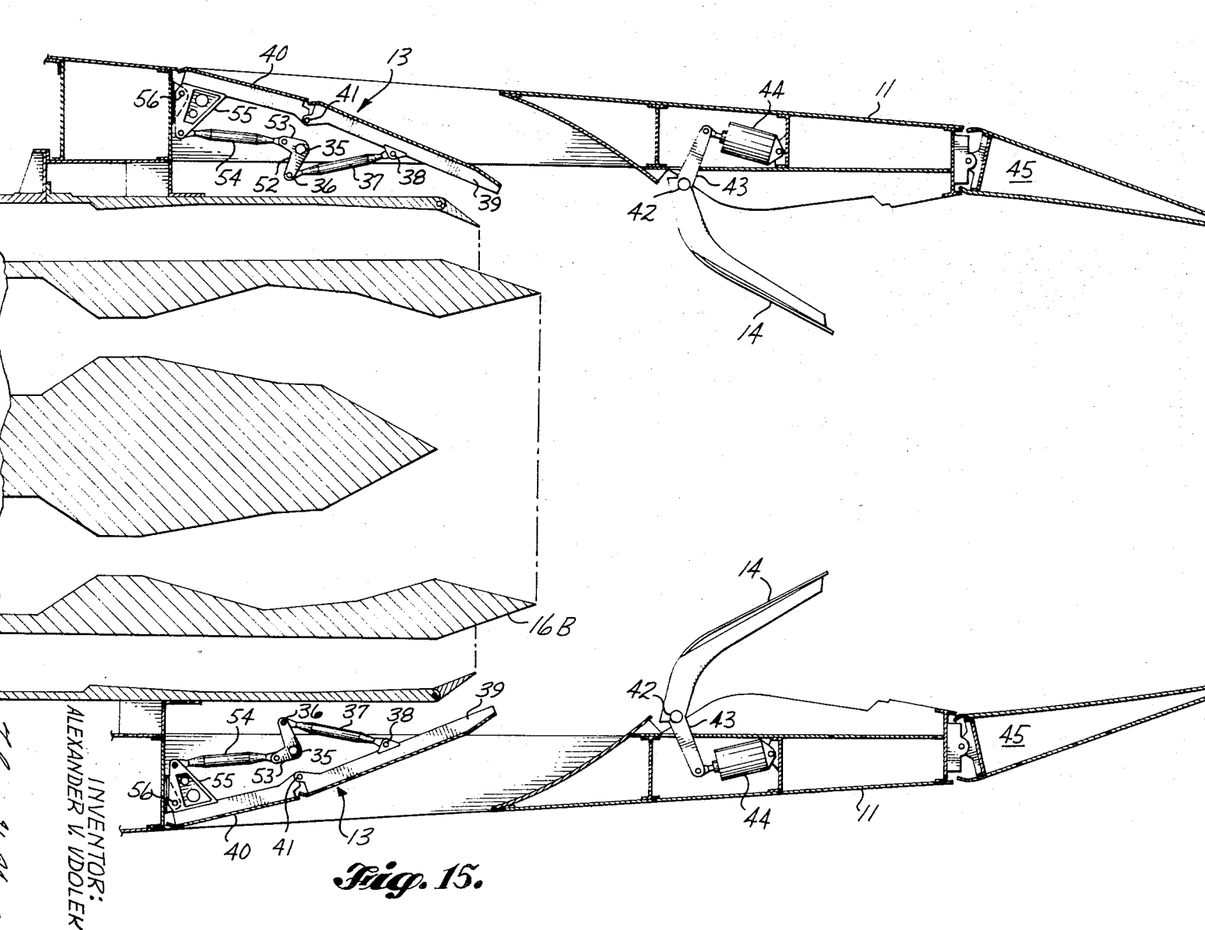
FIG. 15 is a modification of FIG. 14 wherein the sound suppressor is in fully extended position.

FIG. 15 is the same modification of the combination thrust reverser and sound suppressor of FIG. 14 except it is a longitudinal section through a pair of extended sound suppressor chutes 14 similar to those of FIG. 13. Secondary nozzle flaps 45, FIG. 15, are closed slightly due to the pressure differential therein during subsonic flight.

A feature of importance as illustrated in FIG. 1, is the efficient combination and integration of the sound suppressor chutes 14 with the thrust reverser doors 12 around the periphery of the internal surface of the housing 11, the chutes 14 alternating with doors 12 completely around the circumference of the housing 11. As shown in FIG. 1, the sound suppressor chutes 14 are shaped to fit in the diamond-shaped space between the thrust reverser doors 12, the actuators for each being positioned in between the walls of housing 11.

Actuator 58, FIG. 15 moves arm 59, which is integral with chute 14, fore and aft to retract and extend, respectively, the sound suppressor chute 14. When chute 14 is extended, secondary nozzle 45 is closed slightly due to the pressure differential therein, particularly during subsonic flight when the sound suppressor is used.

When intensive cooling of the noise suppressor chutes is required as when afterburning is applied during takeoff, a cool air stream or liquid may be injected into or within the chutes. Accordingly an aircraft having a novel combination thrust reverser and sound suppressor is disclosed for forming an efficient aircraft wherein tertiary doors having fore and aft parts or portions are disclosed as being connected to the thrust reverser doors for opening the aft portion of the tertiary door during reverse thrust for preventing reingestion of the exhaust gases, the aircraft and scorching and sooting of the airplane skin. Likewise, the tertiary doors are further responsive to the thrust reverser doors for opening both the fore-and-aft tertiary door portions for forming an aerodynamically smooth inlet duct for supplying air to the secondary nozzle. Further, a few of the tertiary doors adjacent to the aircraft or wing surface are responsive to the thrust reverser doors for being maintained closed during reverse thrust for the prevention of exhausting hot gases against the aircraft surfaces.

In addition, a novel thrust reverser is disclosed wherein the main supporting link is connected at the centroid of the thrust reverser doors whereby little force is required for movement of the doors to all positions between retracted position for providing zero reverse thrust to fully extended position for generating maximum reverse thrust, for use as a modulating thrust reverser as a brake in the ground subsequent to landing or prior to an aborted takeoff, a modulating thrust reverse for inflight reversing for rapid descent, and a thrust modulator for rapid thrust adjustments as may be required during a landing approach. The balanced doors require only a very small force for movement thereof and for retention thereof in any position independent of the engine thrust setting.

Likewise, the balanced thrust reverser doors may thus be activated rapidly to produce an instantaneous change in thrust, either from forward to reverse thrust or from reverse thrust to forward thrust without loss of time. As is well known, the present jet engines require a reduction in engine power output to idle before the forces on the unbalanced thrust reverser doors by the gas flow can be overcome and the thrust reverser doors then moved to the other position and the jet engine accelerated back to the required output. This procedure produces a great loss in previous seconds of time, this loss in time making a particularly precarious situation during an aborted takeoff or during most any landing. The new balanced thrust reverser doors permit instantaneous activation, with little effort, with no reduction of jet engine output required, and with great savings of time. The above operation has been proven apodictical.

While only two embodiments of the invention have been disclosed, it will be evident that various other modifications are possible in the arrangement and construction of the disclosed combination aircraft thrust reverser and sound suppressor and a particular full range balanced thrust reverser, and it is accordingly desired to comprehend within the purview of this invention such modifications as may be considered to fall within the appended claims.

I claim:

1. In combination with an aircraft engine, a thrust reverser system comprising: a longitudinally extending annular housing surrounding and extending aft the primary exhaust nozzle of said engine, said housing having an interior wall forming a secondary exhaust nozzle passageway and an exterior wall forming an aerodynamic cowling surface exposed to ambient air; pivot means rigidly affixed to said annular housing for establishing pivot points which are prevented from movement longitudinally with respect to said primary exhaust nozzle; thrust reverser door members having inoperative positions wherein they are deployed along the walls of said housing and operative positions wherein they are extended into said passageway; link means pivotally mounted at one end to said pivot means and pivotally mounted at the opposite end to said door members at the location of the center of pressure of exhaust gases impinging on said door members when they are extended into said passageway; and actuating means pivotally connected to one end portion of each of said door members for selectively translating said end portion longitudinally toward and away from said primary exhaust nozzle to rotate said door members with respect to said opposite end of said link means and thereby displace said door members within said passageway to change the flow of said gases for the purpose of modulating the thrust of said engine; wherein each of said door members is supported in balanced fashion about the center of pressure of exhaust gases impinging thereon such that only a minimal force is required by said actuating means to rapidly displace said door members into any desired position for thrust modulation and reversal during the flight regime including emergency descent, landing, and aborted takeoff conditions.

2. The system of claim 1 wherein said annular housing includes structure forming a duct passing through said housing, and tertiary door means for preventing flow through said duct when disposed in an inoperative position and operably responsive to displacement of said door members to move to operative positions allowing flow through said duct.

3. The thrust reverser system of claim 1 wherein said actuating means comprises longitudinally extending track means located within said annular housing, and carriage means mounted on said track means for longitudinal travel toward and away from said pivot point of said pivot means.

4. The system of claim 1 which additionally includes sound suppression means comprising a pivotally mounted sound suppressor chute located between each of said thrust reverser door members and having an inoperative position along said interior wall, and an operative position wherein it is disposed into said secondary exhaust nozzle passageway.